United States Patent [19]
Ludloff et al.

[11] Patent Number: 5,231,402
[45] Date of Patent: Jul. 27, 1993

[54] METHOD FOR DETECTING AND CLASSIFYING HELICOPTERS

[75] Inventors: Albrecht Ludloff; Manfred Minker, both of Ulm; Frank Hagedorn, Nersingen, all of Fed. Rep. of Germany

[73] Assignee: Telefunken Systemtechnik GmbH, Ulm, Fed. Rep. of Germany

[21] Appl. No.: 900,950

[22] Filed: Aug. 11, 1986

Related U.S. Application Data

[63] Continuation-in-part of Ser. No. 855,153, Apr. 2, 1986, abandoned.

[30] Foreign Application Priority Data

Apr. 2, 1985 [DE] Fed. Rep. of Germany ....... 3512032

[51] Int. Cl.$^5$ .............................................. G01S 7/35
[52] U.S. Cl. ................................................... 342/192
[58] Field of Search ........................................ 342/192

[56] References Cited

U.S. PATENT DOCUMENTS

| | | | |
|---|---|---|---|
| 4,241,350 | 12/1980 | Uffelman | 342/192 X |
| 4,275,396 | 6/1981 | Jacomini | 342/192 X |
| 4,348,674 | 9/1982 | Muth et al. | |
| 4,389,647 | 6/1983 | Fanuele et al. | |
| 4,536,764 | 8/1985 | Freeman | 342/192 X |
| 4,719,606 | 1/1988 | Andrieu | 342/192 X |
| 5,081,459 | 1/1992 | Guillerot | 342/192 X |

*Primary Examiner*—T. H. Tubbesing
*Attorney, Agent, or Firm*—Spencer, Frank & Schneider

[57] ABSTRACT

To detect and classify a helicopter as a target by means of a radar system equipped with a Doppler filter bank, an initial determination is made as to whether the threshold value has been exceeded in a substantial number of the individual filters of the Doppler filter bank, and if so, the width of that amplitude band delimited by the highest and lowest amplitudes of the filter output signals is determined and a decision regarding the presence of a helicopter target is derived from the width of the amplitude band.

18 Claims, 3 Drawing Sheets

METHOD FOR DETECTING AND CLASSIFYING HELICOPTERS

This application is a continuation-in-part of application Ser. No. 06/855,153, filed Apr. 2, 1986, now abandoned.

BACKGROUND OF THE INVENTION

The invention relates to a method for detecting and classifying helicopters by means of a radar system.

The detection of flying targets by means of radar surveillance systems is based essentially on the evaluation of the radial velocity of the flying object relative to the location of the radar system. With every revolution of the antenna, the target is covered for a period of less than about 50 ms and reflects a series of echo pulses which are evaluated by the radar signal processing system.

If a radial component is absent, as for example for tangential flight, the change in position from antenna revolution to antenna revolution is considered to be a flying target criterion.

Insofar as a helicopter performs similar movements, it is discovered and displayed by the radar system in the same manner as other flying targets. However, without further measures, the target cannot be classified as a helicopter, i.e. cannot be distinguished from other moving targets, as for example fixed wing aircraft.

One characteristic of helicopters which is particularly significant for combat helicopters, is their capability to be able to hover stationarily at a low height, thus eliminating the radial velocity component as well as the change in position for the detection process. The problem in this situation is to classify the helicopter as such in its environment of false targets (remnants of fixed target clutter, angels, road traffic, rain clutter).

In the interest of short sweep periods, and thus a high information renewal rate, the target dwell period, i.e., the time during which an individual target point is illuminated by the antenna lobe of the radar surveillance system, is usually less than 50 ms. Accordingly, the detailed evaluation of the spectrum of the target echoes or of the time curve of echoes from the same target is generally impossible.

SUMMARY OF THE INVENTION

It is therefore an object of the present invention to provide a method for the improved detection and recognition of helicopters by means of a radar system operating with short target dwell periods.

The above object is achieved according to the present invention by a method for detecting and classifying helicopter targets by means of a radar system employing a Doppler filter bank equipped with a plurality of individual filters for detecting fixed and moving targets, which method comprises the steps of: checking the outputs of the individual filters to see if the respective detection thresholds have been exceeded; upon the occurrence of exceeded thresholds in the plurality of the individual filters, determining the width of the amplitude band delimited by the amplitudes of the highest and lowest filter output signals from the filters whose thresholds have been exceeded; and, deriving a decision regarding the presence of a helicopter target from the determined width of the amplitude band.

The invention takes advantage of the realization that, in addition to the spectrally narrow banded echo components of the body of the helicopter, the echo components originating from its main and tail rotors are distributed over a broad spectral range compared to the usual pulse repetition frequencies (PRF) of radar surveillance systems. Due to the fact that the rotor echoes overlap into the unequivocal Doppler frequency range, thresholds will be exceeded in a plurality of the individual filters of the Doppler filter band for a high percentage of possible situations and the amplitude values of the output signals of the Doppler filters will exhibit very little spread.

Based on this realization, the invention determines whether the detection threshold is exceeded in a plurality, preferably more than 75%, of the Doppler filters. If necessary, the width of the amplitude band defined by the amplitudes of the highest and lowest filter output signals of the respective individual filters is determined.

According to an advantageous feature, the amplitudes of those Doppler filters which contain the body echo of the helicopter are left out of consideration. This is advantageously accomplished in that the n highest amplitudes of the Doppler filter output signals are not considered in the determination of the width of the amplitude band, with n being small compared to the total number N of Doppler filters and preferably $n < \frac{1}{8} N$.

In this way, high amplitudes in the fixed target filters originating from possibly occurring ground clutter can also be excluded from the evaluation. To suppress ground clutter, a memory which contains known ground targets stored by resolution or regional cells (clutter map) may be provided so that, after the comparison, the output signals of the fixed target filters may be excluded from the evaluation for helicopter classification in dependence on the memory stored clutter intensity.

A decision about the existence of a helicopter target is derived from the determined width of the amplitude band. In a first approximation it then applies that the probability of the presence of a helicopter target is greater, the narrower the amplitude band. In addition to a yes/no decision by way of comparison of the determined width of the amplitude band with a threshold value it may advantageously be provided that a probability value for the presence of a helicopter target is assigned to each one of the target reports, and this value is also put out or displayed when the target report is put out or displayed. Instead of making a target determination directly from the width of the amplitude band, a target determination can also be made from a comparison of the probability values with a threshold value.

The method according to the invention can be supported by an additional revolution or sweep correlation method. That is, in order to suppress false target reports produced by interference from other radar systems or jammers, it may be provided that target reports from successive radar periods or successive blocks (bursts) of the Doppler processing system are compared and a conclusion as to the presence of a genuine helicopter target is drawn only if two or more azimuthally successive helicopter target reports occur in the same distance ring.

The determination of the width of the amplitude band and the decision about the presence of a helicopter target are preferably made off-line, with a programmable processor or computer possibly available for general target extraction being advantageously also utilized for the classification of helicopters by means of additional program sections.

DETAILED DESCRIPTION OF THE PREFERRED EMBODIMENT

Figure 1:
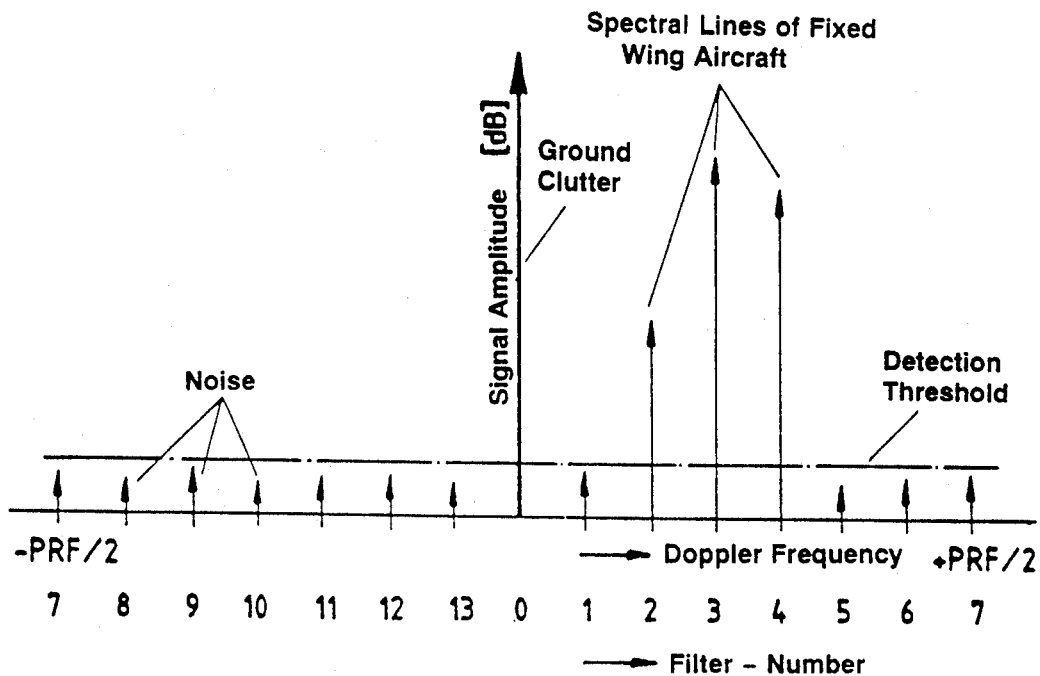
FIG. 1 shows the typical spectrum of the signal amplitudes produced at the output of a Doppler filter bank by a fixed wing aircraft.

Referring now to FIG. 1, there is shown a typical spectrum of a fixed wing aircraft in the form of the signal amplitudes at the filter outputs for the example of a Doppler filter bank composed of 14 individual filters (filters 0 . . . 13). As can be seen from the amplitude values, the detection threshold is exceeded in only three filters, i.e., filters 2, 3 and 4, and additionally filter 0 exhibits a strong echo originating from ground clutter.

Figure 2:
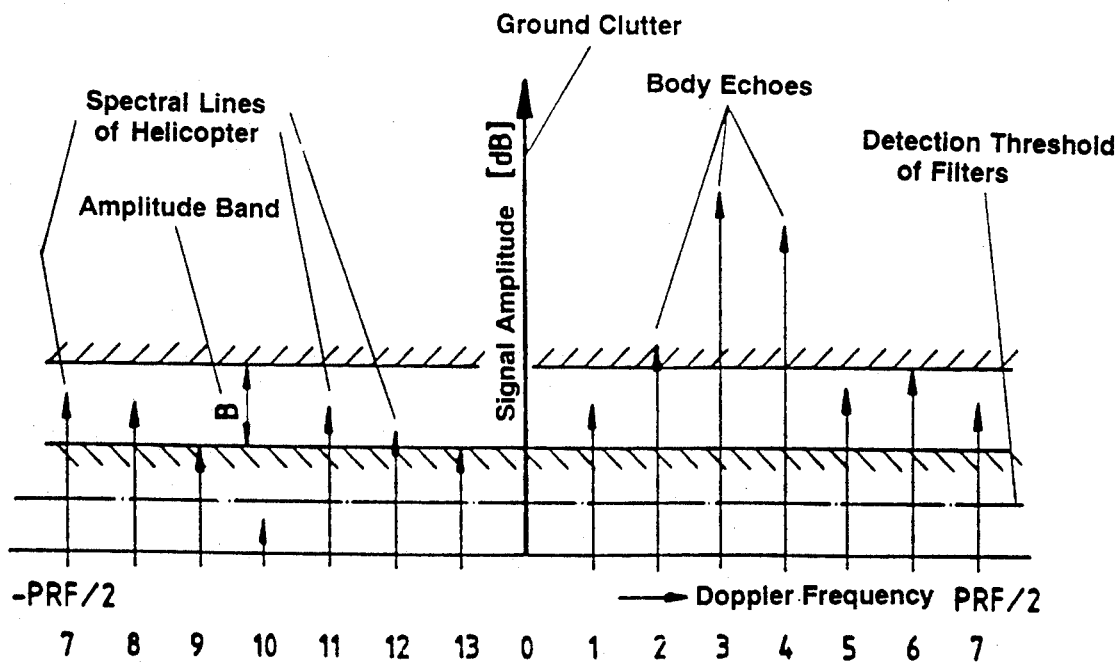
FIG. 2 shows the typical spectrum of the signal amplitudes produced at the output of the same Doppler filter bank by a helicoptor whose body has the same radial velocity as the fixed wing aircraft which produced the spectrum of FIG. 1.

FIG. 2 shows the spectrum of a helicopter whose cell (body) has the same radial velocity as the fixed wing aircraft in FIG. 1. As can be seen, the ground clutter echo is present again, and the detection threshold has been exceeded in 13 of the 14 filters of the filter bank, i.e. in all filters except filter 10.

As pointed out above, according to a first criterion of the method according to the invention for the detection of a helicopter, the detection threshold must be exceeded in a substantial number, and preferably more than 75%, of the individual Doppler filters. Accordingly, since in the signal amplitude spectrum of FIG. 1 the detection threshold is exceeded in only 4 of a total number of 14 filters, an initial decision of a "fixed wing aircraft" is made. On the other hand, in the signal amplitude spectrum of FIG. 2, wherein the detection threshold of 13 of the 14 filters of the filter bank have been exceeded, the first criterion for the detection of a helicopter according to the invention has been met.

Once the first criterion for the detection of a helicopter has been met, the width of the amplitude band of the individual filters which have responded, i.e. the amplitude band delimited by the highest and lowest amplitudes of the output signals of the individual filters which have responded, is determined, the width is compared with a preset threshold value, and a target report indicating the detection of a helicopter is generated if the width of the amplitude band is less than this preset threshold value. Preferably, according to a feature of the invention, the n highest amplitudes of the Doppler filter output signals, where n is small compared to the total number N of the Doppler filters, are not considered in the determination of the band width since these signals generally originate from ground clutter and/or the body of the helicopter. Preferably n is less than $\frac{1}{3}N$ and in general is between 1 and 4.

When using the above preferred feature of the invention with the amplitude spectrum of FIG. 2, it can be seen that the ground clutter and body echoes are provided by four individual filter outputs, i.e. filters 0, 2, 3 and 4, so that n equals 4. When the n=4 highest amplitudes which originate from ground clutter and from the body of the helicopter are left out of consideration, the amplitude band shown in FIG. 2 results which has a width B delimited by the fifth highest amplitude (filter 6) and the lowest amplitude (filters 9 and 13). This width B is then compared with a threshold value and if B is less than the threshold value, a helicopter has been detected. The lowest possible limit of the amplitude band is the detection threshold of the individual filters.

FIG. 2 shows that the proposed method for making a distinction between helicopters and fixed wing aircraft can be used for helicopters which are hovering as well as those that are in translatory flight.

Figure 3:
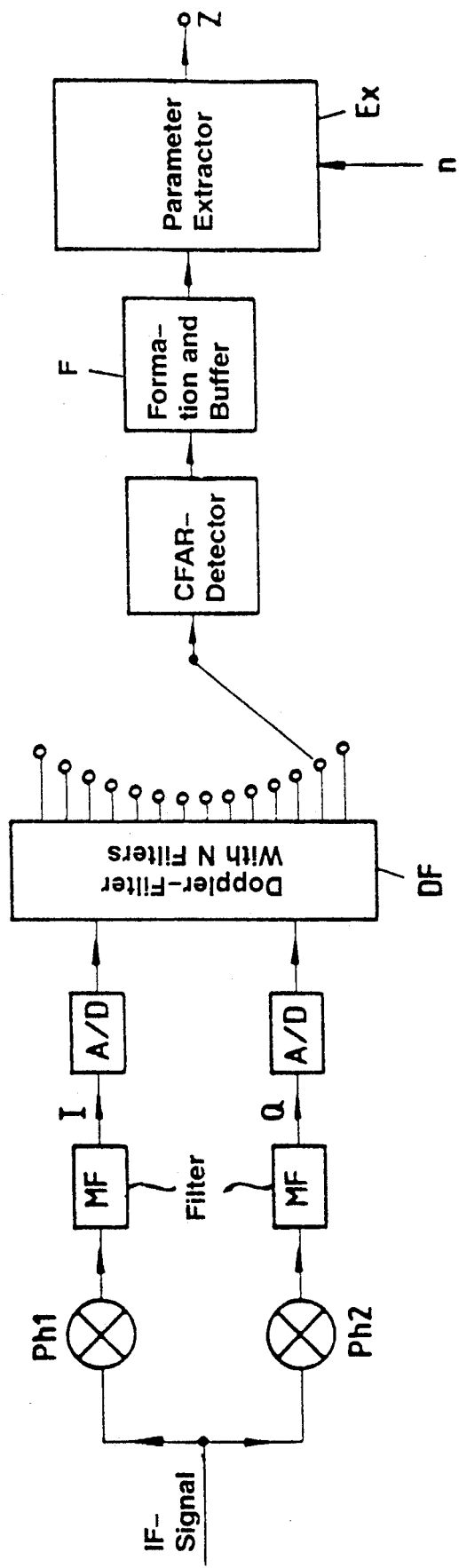
FIG. 3 is a block circuit diagram of a Doppler radar system for carrying out the method according to the invention.

FIG. 3 shows the structure of the signal processing sequence of an MTD (moving target detector) or a pulse Doppler radar with which the helicopter detection according to the present invention is performed.

In a conventional manner, phase detectors Ph1 and Ph2 each receive the IF signal, which is there converted to the video position (IF=0) and then fed to respective single pulse matched filters MF for filtering. The respective outputs of the individual filters MF are fed to respective analog to digital converters (A/D) wherein the in-phase (I) and the quadrature (Q) signal components are sampled and converted from analog to digital form. The digital output signals of the converters are fed to the Doppler filter bank DF composed of N filters (here 14) for Doppler filter processing in a known manner. In order to save hardware, in the illustrated embodiment of FIG. 3 the output signals from the individual Doppler filters of the filter bank DF are fed to a single conventional CFAR detector which processes all of the filter output signals in time multiplex. If the detection threshold of a filter is exceeded, a filter report is generated and buffered or stored in a formatter F, with the report containing, inter alia, the distance cell, the filter number and the filter output amplitude.

The filter reports buffered in unit F are fed to a parameter extractor Ex which, for example, is a programmed computer. For the detection of a helicopter according to the invention, the parameter extractor Ex checks each distance cell in a filter report to determine whether almost all of the filters have responded, e.g. 11 of the 14 individual filters. If yes, the parameter extractor Ex then calculates the width B of the amplitude band as already described above and compares it with a preset threshold value. If the width B remains below this preset threshold value, a helicopter is deemed to be present and a corresponding helicopter target report Z is issued. For each input, the radar operator may set the number n of the highest amplitudes of the Doppler filter bank to be suppressed in the extractor Ex during the determination of the width of the amplitude band.

High amplitude signals from the fixed target filters and originating from possibly occurring ground clutter can also be excluded from the evaluation to determine the presence of a helicopter by providing the extractor or computer Ex with a memory which contains the amplitude spectra for known ground targets stored by resolution or regional cells (clutter map), and then comparing the stored signals corresponding to ground targets with the output signals from the filters. If output signals corresponding to a stored fixed target are found to exist in the output signals from the filters, then the extractor Ex excludes these output signals of the fixed target filters from the calculation of the width of the amplitude band for the evaluation for helicopter classification.

As mentioned above, the probability of the actual presence of a helicopter target becomes greater as the width B of the amplitude band becomes narrower. Accordingly, another feature of the invention provides that in addition to a yes/no decision resulting from comparing the determined width B of the amplitude band with a threshold value, the parameter extractor Ex assigns a probability value for the presence of a helicopter target to each of the target reports, with this probability value being transmitted or displayed when the target report Z is transmitted or displayed. Alternatively, instead of making a target determination directly from the width B of the amplitude band, the extractor Ex can make a target determination from a comparison of the assigned probability value with a different threshold value, and a helicopter target report generated if the probability value is greater than the threshold value.

Finally, in order to suppress false target reports produced for example by interference from other radar systems or jammer, the extractor or computer Ex may compare target reports, which were produced according to the basic invention, from successive radar periods or successive blocks (bursts) of the Doppler processing system and provide a final helicopter report only if two or more azimuthally successive individual helicopter reports occur in the same distance ring of the radar system.

Figure 4:
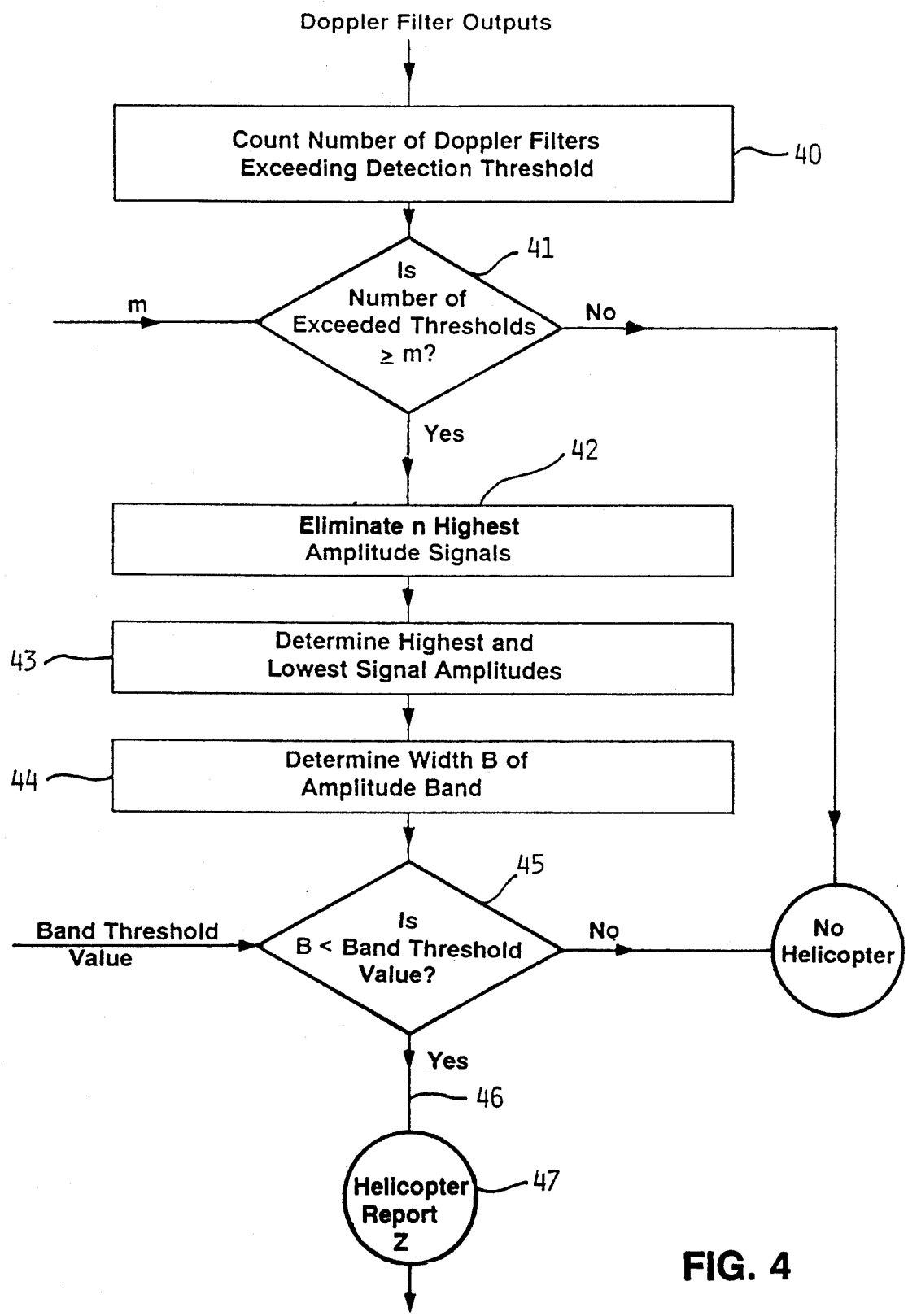
FIG. 4 is a flow diagram showing the processing sequence in the parameter Extracter Ex of FIG. 3 for generating a helicopter target report according to the preferred embodiment of the invention.

Turning now to FIG. 4, there is shown a clear sketch of the processing sequence in the parameter extractor Ex according to a preferred embodiment of the invention. The plurality of Doppler filter output signals from filter bank DF (FIG. 3) are here processed jointly for one distance cell. At the input of the extractor, there are now available the filter output signals which exceed the filter detection threshold. In a first step (40), a count is made as to how many of such threshold exceeding filter output signals are present, and then this count is compared to a value m in a second step (41). If the count is less than the value m, a "NO" determination is produced and processing of the filter output signals for helicopter detection is not continued. As indicated above, the detection threshold should preferably be exceeded in at least 75% of the filter outputs so that with, for example, a total of N=14 individual Doppler filters, m has the value 11. Only if the detection thresholds are exceeded in m or more of the Doppler filters in the second step (41), i.e., a "Yes" determination is made, does processing of the filter output signals continue.

The further processing following a "Yes" determination includes initially eliminating the output signals with the n highest amplitude values (42), with n being small compared to the total number N of Doppler filters, for example n=4 for N=14. Thereafter, from the remaining output signals, the highest and the lowest amplitude values are selected or determined in a further step (43). The difference between these two selected amplitude values, which defines the width B of the amplitude band of the output signals remaining after elimination of the n highest amplitudes, is then determined (44). Then the value B which determines the width of the amplitude band is compared with a preset bandwidth threshold value (45). Only if the determined value B lies below the band threshold value, is a conclusion made that a helicopter target is present, i.e., a "Yes" determination on line 46, and, the respective target report Z issued (47). Alternatively, if the determined value B is above the band threshold value, a "no helicopter" decision is made.

It will be understood that the above description of the present invention is susceptible to various modifications, changes and adaptations, and the same are intended to be comprehended within the meaning and range of equivalents of the appended claims.

What is claimed is:

1. A method for detecting and classifying helicopter targets by means of a radar system employing a Doppler filter bank equipped with a plurality of individual filters for detecting fixed and moving targets, said method comprising the steps of: checking the outputs of the individual filters to see if the respective detection thresholds have been exceeded; upon the occurrence of exceeded thresholds in the plurality of the individual filters, determining the width of the amplitude band delimited by the amplitudes of the highest and lowest filter output signals produced by the filters whose threshold has been exceeded; and deriving a decision regarding the presence of a helicopter target from the determined width of said amplitude band.

2. A method as defined in claim 1, wherein said step of determining the width of the amplitude band is carried out only if the detection thresholds in a substantial number of the individual filters have been exceeded.

3. A method as defined in claim 2, wherein said step of determining the width of the amplitude band is carried out only if detection thresholds are exceeded in more than 75% of the individual filters.

4. A method as defined in claim 2, wherein the n highest amplitudes are not utilized in said step of determining the width of the amplitude band, where n is substantially less than the total number of individual filters.

5. A method as defined in claim 4, wherein said step of determining the width of the amplitude band includes eliminating the highest amplitudes of less than ⅓ of the total number of individual filters.

6. A method as defined in claim 4, wherein said step of determining the width of the amplitude band includes eliminating between one and four of the highest amplitudes of the individual filters.

7. A method as defined in claim 4, wherein said step of deriving includes comparing the determined width of the amplitude band with a predetermined threshold value, and providing a target report indicating the presence of a helicopter target if said determined band with is below said predetermined threshold value.

8. A method as defined in claim 2, further comprising comparing the amplitudes of the output signals of the individual fixed target filters of the filter bank with stored values corresponding to fixed targets (clutter map); and wherein if output signals corresponding to a fixed target are present in the said output signals from said filters, the output signals of the filters corresponding to a fixed target are not utilized during said step of determining the width of the amplitude band.

9. A method as defined in claim 2, wherein said step of deriving includes comparing the determined width of the amplitude band with a predetermined threshold value, and providing a target report indicating the presence of a helicopter target if said determined band width is below said predetermined threshold value.

10. A method as defined in claim 9, further comprising: assigning a probability value to said target report as a function of said determined width of the amplitude band, with a narrow amplitude band corresponding to a higher value than a broad amplitude band; and transmitting or displaying information regarding said assigned probability value if said target report indicating the presence of a helicopter is transmitted or displayed, respectively.

11. A method as defined in claim 2, wherein said step of deriving a decision comprises assigning a probability value to said target report as a function of said determined width of the amplitude band, with a narrow amplitude band corresponding to a higher probability value than a broad amplitude band; comparing said assigned probability value with a predetermined threshold value; and providing a target report indicating the presence of a helicopter only if said probability value is above said predetermined threshold value.

12. A method as defined in claim 11, further comprising transmitting or displaying information regarding said assigned probability value if said target report indicating the presence of a helicopter is transmitted or displayed, respectively.

13. A method as defined in claim 1, further comprising generating a target report if a positive decision indicating the presence of a helicopter is derived; and subjecting said test report to an additional antenna revolution correlation process.

14. A method as defined in claim 1, further comprising: generating a target report if a positive decision indicating the presence of a helicopter is derived; and comparing target reports from successive radar periods or successive blocks of Doppler processing to verify the presence of a genuine helicopter target.

15. A method as defined in claim 1 wherein said steps of determining the width of the amplitude band and of deriving a decision regarding the presence of a helicopter target are carried out off-line.

16. A method for detecting and classifying helicopter targets by means of a radar system employing a Doppler filter bank including a plurality of individual filters for detecting fixed and moving targets, said method comprising the steps of: checking the outputs of the individual filters and counting the number of filters whose outputs have exceeded the respective detection thresholds;

comparing the counted number of filters whose detection threshold has been exceeded with a preset value;

if said counted number of filters is above said preset value, eliminating the n highest amplitudes of the output signals from the filters, where n is substantially less than the total number of individual filters;

thereafter, determining the width of the amplitude band delimited by the amplitudes of the highest and lowest of the remaining filter output signals produced by the filters whose detection threshold has been exceeded;

comparing the determined width of the amplitude band with a predetermined band threshold value; and, providing a target report indicating the presence of a helicopter target if said determined band width is below said predetermined band threshold value.

17. A method as defined in claim 16 wherein said step of comparing the counted number of filters comprises comparing the counted number with a preset value which is at least equal to 75% of the total number of the individual said filters.

18. A method as defined in claim 16 wherein said step of eliminating the n highest amplitudes comprises eliminating the highest amplitudes of less than ⅓ of the total number of individual filters.

* * * * *